(12) United States Patent
Daniel

(10) Patent No.: US 9,605,377 B2
(45) Date of Patent: Mar. 28, 2017

(54) POLYMERIC BLEND FORMULATIONS SUITABLE FOR SYNTHETIC LEATHER APPLICATIONS

(75) Inventor: Sherrika D. Daniel, Manvel, TX (US)

(73) Assignee: Dow Global Technologies LLC, Midland, MI (US)

( * ) Notice: Subject to any disclaimer, the term of this patent is extended or adjusted under 35 U.S.C. 154(b) by 342 days.

(21) Appl. No.: 14/122,905

(22) PCT Filed: Jul. 25, 2012

(86) PCT No.: PCT/US2012/048089
§ 371 (c)(1),
(2), (4) Date: Nov. 27, 2013

(87) PCT Pub. No.: WO2013/016398
PCT Pub. Date: Jan. 31, 2013

(65) Prior Publication Data
US 2014/0315037 A1    Oct. 23, 2014

Related U.S. Application Data

(60) Provisional application No. 61/512,508, filed on Jul. 28, 2011.

(51) Int. Cl.
| | | |
|---|---|---|
| *C08L 23/08* | (2006.01) | |
| *C08L 23/28* | (2006.01) | |
| *D06N 3/18* | (2006.01) | |
| *D06N 3/04* | (2006.01) | |
| *B32B 27/08* | (2006.01) | |
| *B32B 27/12* | (2006.01) | |
| *B32B 27/18* | (2006.01) | |
| *B32B 27/20* | (2006.01) | |
| *B32B 27/32* | (2006.01) | |
| *C09D 123/08* | (2006.01) | |

(52) U.S. Cl.
CPC ............... *D06N 3/18* (2013.01); *B32B 27/08* (2013.01); *B32B 27/12* (2013.01); *B32B 27/18* (2013.01); *B32B 27/20* (2013.01); *B32B 27/32* (2013.01); *C08L 23/0815* (2013.01); *C09D 123/0815* (2013.01); *D06N 3/045* (2013.01); *D06N 3/183* (2013.01); *B32B 2255/26* (2013.01); *B32B 2270/00* (2013.01); *C08L 2205/02* (2013.01); *C08L 2205/03* (2013.01); *Y10T 156/10* (2015.01); *Y10T 428/31938* (2015.04)

(58) Field of Classification Search
CPC ...... D06N 3/18; D06N 3/045; C08L 23/0815; C08L 23/286
See application file for complete search history.

(56) References Cited

U.S. PATENT DOCUMENTS

| | | | | |
|---|---|---|---|---|
| 4,438,228 | A * | 3/1984 | Schenck | C08L 23/0815 428/95 |
| 4,472,545 | A * | 9/1984 | Coughlin | B32B 27/18 428/904 |
| 4,591,621 | A | 5/1986 | Ennis | |
| 4,599,392 | A | 7/1986 | McKinney et al. | |
| 4,767,817 | A * | 8/1988 | Lee | C08K 7/14 524/494 |
| 4,767,823 | A | 8/1988 | Jones et al. | |
| 4,988,781 | A | 1/1991 | McKinney et al. | |
| 5,242,987 | A | 9/1993 | Brugel | |
| 5,268,051 | A * | 12/1993 | Kent | C09J 123/34 156/162 |
| 5,272,236 | A | 12/1993 | Lai et al. | |
| 5,278,272 | A | 1/1994 | Lai et al. | |
| 5,504,172 | A | 4/1996 | Imuta et al. | |
| 5,938,437 | A | 8/1999 | DeVincenzo | |
| 6,525,157 | B2 | 2/2003 | Cozewith et al. | |
| 6,960,635 | B2 | 11/2005 | Stevens et al. | |
| 7,608,668 | B2 | 10/2009 | Li Pi Shan et al. | |
| 7,858,706 | B2 | 12/2010 | Arriola et al. | |
| 8,288,470 | B2 | 10/2012 | Ansems et al. | |
| 8,404,773 | B2 * | 3/2013 | Moldovan | C09D 123/0815 524/477 |
| 8,420,760 | B2 | 4/2013 | Hughes et al. | |
| 8,546,477 | B2 * | 10/2013 | Moldovan | C09D 123/0815 156/242 |
| 2004/0236023 | A1 * | 11/2004 | Johnson | C08L 23/0815 525/192 |
| 2009/0172970 | A1 | 7/2009 | Prieto et al. | |
| 2009/0233115 | A1 | 9/2009 | Moldovan | |
| 2012/0108134 | A1 | 5/2012 | Chee et al. | |
| 2013/0203939 | A1 | 8/2013 | Peng et al. | |

FOREIGN PATENT DOCUMENTS

| | | |
|---|---|---|
| WO | 98/52981 A1 | 11/1998 |
| WO | 00/01745 A1 | 1/2000 |
| WO | 2009/067017 A1 | 5/2009 |

OTHER PUBLICATIONS

PCT/US2012/048089, 20120917, International Search Report and Written Opinion.

* cited by examiner

*Primary Examiner* — Liam J Heincer

(57) ABSTRACT

The instant invention provides to polymeric blend formulation, and a multilayer structure comprising a skin layer derived from the polymeric blend formulation, and method of making the same. The polymeric blend formulation comprises: (a) 40 to 65 percent by weight of an ethylene-based copolymer composition; (b) 15 to 40 percent by weight of a chlorinated olefin polymer composition; (c) from 0.1 to 25 percent by weight of a filler; (d) 10 to 30 weight percent by weight of an adhesion promoting agent; and (e) optionally, 1 to 4 percent by weight of a mineral oil.

5 Claims, No Drawings

POLYMERIC BLEND FORMULATIONS SUITABLE FOR SYNTHETIC LEATHER APPLICATIONS

CROSS-REFERENCE TO RELATED APPLICATIONS

This application is a non-provisional application claiming priority from the U.S. Provisional Patent Application No. 61/512,508, filed on Jul. 28, 2011, entitled "POLYMERIC BLEND FORMULATION SUITABLE FOR SYNTHETIC LEATHER APPLICATIONS," the teachings of which are incorporated by reference herein, as if reproduced in full hereinbelow.

FIELD OF INVENTION

The instant invention relates to polymeric blend formulation, and a multilayer structure comprising a skin layer derived from the polymeric blend formulation, and method of making the same.

BACKGROUND OF THE INVENTION

The use of polymeric materials in various end-use applications is generally known. Such polymeric materials may, for example, be applied to various substrates via different conventional methods. Such conventional methods include, but are not limited to, calendaring process, lamination process, extrusion process, cast sheet process, or combinations thereof. However, polymeric materials such as olefinic elastomers may not be easily processed to form desired articles such as synthetic leather.

Despite the research efforts in developing polymeric materials suitable for synthetic leather applications, there is a need for a polymeric formulation that provides improved synthetic leather application properties, e.g. improved dry feel in synthetic leather products, improved adhesion to various substrates, as a well as improved processability, e.g. improved calenderability or extrusion.

SUMMARY OF THE INVENTION

The instant invention provides to polymeric blend formulation, and a multilayer structure comprising a skin layer comprising a sheet derived from the polymeric blend formulation, and method of making the same.

In one embodiment, the present invention provides a polymeric blend formulation comprising: (a) 40 to 65 percent by weight of an ethylene-based copolymer composition; (b) 15 to 40 percent by weight of a chlorinated olefin polymer composition; (c) 0.1 to 25 percent by weight of a filler; (d) 10 to 30 weight percent by weight of an adhesion promoting agent; and (e) optionally, 1 to 4 percent by weight of a mineral oil.

In alternative embodiment, the present invention provides a process for producing a polymeric blend formulation comprising the steps of: (1) providing an ethylene-based copolymer composition, wherein said ethylene-based copolymer composition comprises from 40 to 60 percent by weight based on the weight of the polymeric blend formulation; (2) providing a chlorinated olefin polymer composition, wherein said chlorinated olefin polymer composition comprises from 25 to 40 percent by weight based on the weight of the polymeric blend formulation; (3) providing a filler, wherein said filler comprises from 0.1 to less than 25 percent by weight based on the weight of the polymeric blend formulation; (4) providing an adhesion promoting agent, wherein said adhesion promoting agent comprises from 10 to 30 percent by weight based on the weight of the polymeric blend formulation; (5) optionally, providing a mineral oil, wherein said mineral oil comprises 1 to 4 percent based on the weight of the polymeric blend formulation; (6) melt blending said ethylene-based copolymer composition, said chlorinated olefin polymer composition, said filler, said adhesion promoting agent, and said optional mineral oil; and (7) thereby producing said polymeric blend formulation.

In an alternative embodiment, the present invention provides a multilayer structure comprising (1) a skin layer comprising a sheet derived from a polymeric blend formulation comprising: (a) 40 to 65 percent by weight of an ethylene-based copolymer composition; (b) 15 to 40 percent by weight of a chlorinated olefin polymer composition; (c) 0.1 to 25 percent by weight of a filler; (d) 10 to 30 weight percent by weight of an adhesion promoting agent; and (e) optionally, 1 to 4 percent by weight of a mineral oil, (2) optionally, an inner layer derived from an aqueous dispersion; and (3) a substrate layer, wherein said inner layer is disposed therebetween said skin layer and said substrate layer.

In an alternative embodiment, the present invention provides a method for making the inventive multilayer structure comprising the steps of (1) laminating a sheet derived from a polymeric blend formulation comprising (a) 40 to 65 percent by weight of an ethylene-based copolymer composition; (b) 15 to 40 percent by weight of a chlorinated olefin polymer composition; (c) 0.1 to 25 percent by weight of a filler; (d) 10 to 30 weight percent by weight of an adhesion promoting agent; and (e) optionally, 1 to 4 percent by weight of a mineral oil, to a substrate, optionally, in the presence of an inner layer derived from an aqueous dispersion on at least one surface of said substrate; and (2) thereby forming said multilayer structure comprising said skin layer, optionally, an inner layer derived from said aqueous dispersion; and said substrate layer.

In an alternative embodiment, the instant invention provides a polymeric blend formulation, method of producing the same, multilayer structures comprising a skin layer derived from such polymeric blend formulations, and method of making such multilayer structures, in accordance with any of the preceding embodiments, except that:

(1) the polymeric blend formulation further comprises a stabilizing agent, a processing aid, a pigment, or a plasticizer;

(2) the filler is calcium carbonate;

(3) the adhesion promoting agent is maleic anhydride grafted polyolefin copolymer or ethylene acrylate grafted polyolefin copolymer;

(4) the multilayer structure is synthetic leather suitable for use in various end-use applications including, but not limited to, automotive upholstery, recreational vehicle upholstery, marine upholstery, seating for hospitality, fitness equipment covering, footwear, apparel, banners, tarpaulins, awning, furniture upholstery, medical sheeting, medical drapery, floor covering, wall covering, window covering, book covering, and/or luggage;

(5) the sheet derived from the polymeric blend formulation is made via calendaring process or extrusion process; and/or (6) the multilayer structure further comprises a top coating.

DETAILED DESCRIPTION OF THE INVENTION

The instant invention provides a polymeric blend formulation, and a multilayer structure comprising a skin layer comprising a sheet derived from the polymeric blend formulation, and method of making the same.

The polymeric blend formulation comprises: (a) 40 to 65 percent by weight of an ethylene-based copolymer composition; (b) 15 to 40 percent by weight of a chlorinated olefin polymer composition; (c) 0.1 to 25 percent by weight of a filler; (d) 10 to 30 weight percent by weight of an adhesion promoting agent; and (e) optionally, 1 to 4 percent by weight of a mineral oil.

Ethylene-Based Copolymer Composition

The ethylene-based copolymer composition comprises an elastomeric ethylene copolymer. Elastomeric ethylene copolymers such as ethylene/alpha-olefin copolymers are copolymers of ethylene with at least one $C_3$-$C_8$ alpha-olefin comonomer. Examples of the $C_3$-$C_8$ alpha-olefins include, but are not limited to, propene, 1-butene, 4-methyl-1-pentene, 1-hexene, and 1-octene. Exemplary ethylene-based copolymers include, but are not limited to, ethylene/propylene, ethylene/butene, ethylene/1-octene, and olefin block copolymers such as ethylene multi-block copolymers.

Ethylene-based copolymers include, but are not limited to, copolymers of ethylene and one or more alpha-olefins, for example 1-butene, and/or 1-octene. Such copolymers of ethylene and one or more alpha-olefins can be homogenously branched and substantially linear or linear, having a density in the range of 0.860 to 0.890 g/cm$^3$, and a melt index ($I_2$) in the range of 0.1 to 5 g/10 minutes.

Ethylene multi-block copolymers are described in the International Publication No. WO2005/090427 and U.S. patent application Ser. No. 11/376,835, and may be used as the ethylene-based copolymer composition. Such ethylene multi-block copolymer may be:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, $\Delta H$ in J/g, and a delta quantity, $\Delta T$, in degrees Celsius defined as the temperature difference between the tallest DSC peak and the tallest CRYSTAF peak, wherein the numerical values of $\Delta T$ and $\Delta H$ having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

The ethylene-based copolymer composition may be an ethylene multi-block copolymer also:

(a) having a molecular fraction which elutes between 40° C. and 130° C. when fractionated using TREF, characterized in that the fraction having a block index of at least 0.5 and up to about 1 and a molecular weight distribution, Mw/Mn, greater than about 1.3; or (b) having an average block index greater than zero and up to about 1.0 and a molecular weight distribution, $M_w/M_n$, greater than about 1.3.

The polymeric blend formulation may comprise from 40 to 60 percent by weight of the ethylene-based copolymer composition based on the weight of the polymeric blend formulation, for example, from 45 to 60 weight percent; or in the alternative, from 50 to 60 weight percent. Such ethylene-based copolymer compositions are commercially available under the tradenames ENGAGE™ from The Dow Chemical Company, INFUSE™ from The Dow Chemical Company, EXACT™ from ExxonMobil Chemical Company, or TAFMER™ from Mitsui Chemical.

Chlorinated Olefin Polymer Composition

The chlorinated olefin polymer composition is selected from the group consisting of a) chlorinated polyethylene homopolymers and b) chlorinated copolymers prepared from polyolefins that contain copolymerized units of i) ethylene and ii) a copolymerizable monomer. The chlorinated olefin polymer may, optionally, include chlorosulfonyl groups. That is, the polymer chain will have pendant chlorine groups and chlorosulfonyl groups. Such polymers are known as chlorosulfonated olefin polymers. Representative chlorinated olefin polymers include, but are not limited to, a) chlorinated and chlorosulfonated homopolymers of ethylene and b) chlorinated and chlorosulfonated copolymers of ethylene and at least one ethylenically unsaturated monomer selected from the group consisting of $C_3$-$C_{10}$ alpha monoolefins; $C_1$-$C_{12}$ alkyl esters of $C_3$-$C_{20}$ monocarboxylic acids; unsaturated $C_3$-$C_{20}$ mono- or dicarboxylic acids; anhydrides of unsaturated $C_4$-$C_8$ dicarboxylic acids; and vinyl esters of saturated $C_2$-$C_{18}$ carboxylic acids. Chlorinated and chlorosulfonated graft copolymers are included as well. Specific examples of suitable polymers include, but are not limited to, chlorinated polyethylene; chlorosulfonated polyethylene; chlorinated ethylene vinyl acetate copolymers; chlorosulfonated ethylene vinyl acetate copolymers; chlorinated ethylene acrylic acid copolymers; chlorosulfonated ethylene acrylic acid copolymers; chlorinated ethylene methacrylic acid copolymers; chlorosulfonated ethylene methacrylic acid copolymers; chlorinated ethylene methyl acrylate copolymers; chlorinated ethylene methyl methacrylate copolymers; chlorinated ethylene n-butyl methacrylate copolymers; chlorinated ethylene glycidyl methacrylate copolymers; chlorinated graft copolymers of ethylene and maleic acid anhydride; chlorinated copolymers of ethylene with propylene, butene, 3-methyl-1-pentene, or octene and chlorosulfonated copolymers of ethylene with propylene, butene, 3-methyl-1-pentene or octene. The copolymers may be dipolymers, terpolymers, or higher order copolymers. Alternative exemplary chlorinated olefin polymers include, but are not limited to, chlorinated polyethylene and chlorinated copolymers of ethylene vinyl acetate.

The chlorinated olefin polymers and chlorosulfonated olefin polymers may, for example, be prepared from polyolefin resins that are branched or unbranched. Chlorination or chlorosulfonation of the base resins may take place in suspension, solution, solid state or fluidized bed. Free radical suspension chlorination processes are described and taught in U.S. Pat. No. 3,454,544, U.S. Pat. No. 4,767,823 and references cited therein. Such processes involve preparation of an aqueous suspension of a finely divided ethylene polymer that is then chlorinated. An example of a free radical solution chlorination process is disclosed in U.S. Pat. No. 4,591,621. The polymers may also be chlorinated in the melt or fluidized beds, for example as taught in U.S. Pat. No. 4,767,823. Chlorosulfonation processes are generally performed in solution but suspension and non-solvent processes are also known. Preparation of chlorosulfonated olefin polymers is described in U.S. Pat. Nos. 2,586,363, 3,296,222, 3,299,014, and 5,242,987.

The polymeric blend formulation may comprise from 15 to 40 percent by weight of the chlorinated olefin polymer composition based on the weight of the polymeric blend formulation; for example, from 20 to 30 weight percent. Suitable chlorinated olefin polymer compositions include TYRIN™ available from The Dow Chemical Company, or HYPALON™ (chlorosulfonated) from DuPont Performance Elastomers.

The filler is selected from the group consisting of wollastonite, carbon black, glass, metal carbonates such as calcium carbonate, metal sulfates such as calcium sulfate, talc, clay or graphite fibers. In one embodiment, the filler is, for example, calcium carbonate. The polymeric blend formulation may, optionally, comprise 0.1 to 25 percent by weight of one or more fillers based on the weight of the polymeric blend formulation, for example, from 5 to 15 weight percent.

Adhesion Promoting Agent

The adhesion promoting agent is a polymeric additive facilitating the adhesion of the skin layer comprising a sheet derived from the polymeric blend formulation to a substrate. Exemplary adhesion promoting agents include, but are not limited to, acid or acid derivative functionalized polyolefins. In general, such acid or acid derivative functionalized polyolefins are produced by copolymerizing an acid or acid derivative monomer with an α-olefin or α-olefin mixture or by grafting the monomer onto a polyolefin, e.g., polyethylene. Ionomers of these acid functionalized polyolefins can also be used. Acid or acid derivative monomers copolymerized or grafted to obtain the modified polyolefins are ethylenically unsaturated carboxylic acids or acid derivatives, such as acid anhydrides, esters, salts or the like. Useful monomers include, but are not limited to, acrylic acid, methacrylic acid, maleic acid, fumaric acid, itaconic acid, citraconic acid, mesaconic acid, maleic anhydride (MAH), 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, bicyclo(2.2.1)hept-5-ene-2,3-dicarboxylic acid anhydride, tetrahydrophthalic anhydride, norborn-5-ene-2,3-dicarboxylic acid anhydride, and x-methylbicyclo (2.2.1)hept-5-ene-2,3-dicarboxylic acid anhydride (XMNA).

In one embodiment, the functionalized, i.e., modified, polyolefin may be obtained by grafting an ethylenically unsaturated carboxylic acid or derivative such as esters of unsaturated carboxylic acids, and particularly maleic anhydride (MAH), onto a polyolefin backbone. Exemplary maleic anhydride grafted polyolefin copolymers include, but are not limited to, AMPLIFY™ GR 216 commercially available from The Dow Chemical Company.

Suitable α,β-ethylenically unsaturated carboxylic acids include, but are not limited to, acrylic acids, methacrylic acids, itaconic acids, maleic acids, maleic anhydrides, fumaric acids, monomethyl maleic acids, and mixtures thereof. Preferably, the α,β-ethylenically unsaturated carboxylic acids are selected from the group consisting of acrylic acids, methacrylic acids, and mixtures thereof. Examples of ethylene acrylic acid copolymers include PRIMACOR™ copolymers available from The Dow Chemical Company, and NUCREL™, ethylene methacrylic acid copolymers available from DuPont.

Specific examples of preferred esters of unsaturated carboxylic acids include, but are not limited to, methyl acrylates, methyl methacrylates, ethyl acrylates, ethyl methacrylates, propyl acrylates, propyl methacrylates, isopropyl acrylates, isopropyl methacrylates, butyl acrylates, butyl methacrylates, isobutyl acrylates, isobutyl methacrylate, tert-butyl acrylates, tert-butyl methacrylates, octyl acrylates, octyl methacrylates, undecyl acrylates, undecyl methacrylates, octadecyl acrylates, octadecyl methacrylates, dodecyl acrylates, dodecyl methacrylates, 2-ethylhexyl acrylates, 2-ethylhexyl methacrylates, isobornyl acrylates, isobornyl methacrylates, lauryl acrylates, lauryl methacrylates, 2-hydroxyethyl acrylates, 2-hydroxyethyl methacrylates, glycidyl acrylates, glycidyl methacrylates, poly(ethylene glycol)acrylates, poly(ethylene glycol)methacrylates, poly(ethylene glycol) methyl ether acrylates, poly(ethylene glycol) methyl ether methacrylates, poly(ethylene glycol) behenyl ether acrylates, poly(ethylene glycol) behenyl ether methacrylates, poly(ethylene glycol) 4-nonylphenyl ether acrylates, poly(ethylene glycol) 4-nonylphenyl ether methacrylates, poly(ethylene glycol) phenyl ether acrylates, poly(ethylene glycol) phenyl ether methacrylates, dimethyl maleates, diethyl maleates, dibutyl maleates, dimethyl fumarates, diethyl fumarates, dibutyl fumarates, dimenthyl fumarates, vinyl acetates, vinyl propionates, and the like and mixtures thereof. Preferably, the other unsaturated comonomers are selected from the group consisting of methyl acrylates, methyl methacrylates, butyl acrylates, butyl methacrylates, glycidyl methacrylates, vinyl acetates, and mixtures thereof. Commercial examples include AMPLIFY™ EA copolymers, which are ethylene ethyl acrylate copolymers, available from The Dow Chemical Company.

Suitable ionomers may be ionic compounds which are copolymers of $C_2$ to $C_4$ α-olefin derived units (ethylene is herein included as an "α-olefin"), and $C_3$ to $C_6$ α,β-ethylenically unsaturated carboxylic acids, and which contain one or more kinds of metallic ions associated with the acidic pendant groups of the polymer. Typical ionomers and methods of production are disclosed in, for example, WO 98/52981, WO 95/11929. WO 96/23009, WO 97/11995, and WO 97/02317.

The uncomplexed metal ions suitable for forming the ionic copolymers comprise mono, di or tri-valent metal ions in the Groups 1 through 13 of the Periodic Table of Elements. Embodiments include the following metal ions: $Na^+$, $K^+$, $Li^+$, $Cs^+$, $Ag^+$, $Hg^+$, $Cu^+$, $Be^{2+}$, $Mg^{2+}$, $Ca^{2+}$, $Sr^{2+}$, $Ba^{2+}$, $Cu^{2+}$, $Cd^{2+}$, $Hg^{2+}$, $Pb^{2+}$, $Fe^{2+}$, $Co^{2+}$, $Ni^{2+}$, $Zn^{2+}$, $Al^{2+}$ $Sc^{3+}$, $Fe^{3+}$, $Al^{3+}$ and $Yt^{3+}$. In the various ions mentioned above, $Mg^{2+}$, $Na^+$ and $Zn^{2+}$ are metals used in desirable embodiments. Reaction of the carboxylic acid groups of the ionomer and a metal ion derived from a desirable metal compound (metal oxide, metal chloride, etc.) is referred to as "neutralization."

Ionomers comprising copolymers ethylene derived units and acrylic acid (AA) derived units are desirable. Examples of commercially available ionomers include, but are not limited to, IOTEK™ series such as IOTEK™ 8000, a 45% sodium neutralized ethylene-based ionomer of 15 wt % acrylic acid, and IOTEK™ 7030, a 25% zinc neutralized ethylene-based ionomer of 15 wt % acrylic acid, available from ExxonMobil Chemical Company, and SURLYN™ resins available from DuPont Company, and AMPLIFY™ available from The Dow Chemical Company.

These ionomers can also be neutralized with amine compounds. The ethylene acid copolymers are neutralized with one or more amines to a level of from about 1 to about 100 mol %, based on the copolymer's total carboxylic acid content. The amines may be aliphatic or cycloaliphatic. They may be diamines, triamines, or polyamines. They may incorporate primary amine functions, secondary amine functions, or mixtures thereof. The amine component may incorporate primary amine functions. The amine component may incorporate from 2 to 100 carbon atoms. In the alternative, the amine component may incorporate from 2 to 50 carbon atoms. Exemplary amines include, but are not limited to, ethylene diamine, 1,3-diaminopropane, 1,2-diaminopropane, 1,4-diaminobutane, 1,2-diamino-2-methylpropane, 1,3-diaminopentane, 1,5-diaminopentane, 2,2-dimethyl, 1,3-propanediamine, 1,6-hexanediamine, 2-methyl-1,5-pentanediamine, 1,7-diaminoheptane, 1,8-diaminooctane, 1,9-diaminononane, 1,10-diaminodecane, 1,12-diaminododecane, bis(4-aminocyclohexyl)methane, diethylenetriamine, beta, beta'-diaminodiethyl ether, beta, beta'-diaminodiethyl thioether, 4,9-dioxa-1,12-dodecanediamine, 4,7,10-trioxa-1, 13-tridecanediamine, N-(2-aminoethyl)-1,3-propanediamine, 3,3'diamino-N-methyldipropylamine, 3,3'iminobispropylamine, spermidine, bis(hexamethylene)triamine, triethylenetetramine, N,N'-bis(3-aminopropyl)ethylenediamine, N,N'-bis(2-aminoethyl)-1,3-propanediamine, N,N'-bis(3-aminopropyl)-1,3-propanediamine, spermine, tris(2-aminoethyl)amine, tetraethylenepentamine, pentaethylenehexamine, phenylene diethyl amine, 1,3-diaminomethylxylene, 4,4'methylenebis(2-methylcyclohexylamine), 1,2-diaminocyclohexane, 1,3-diaminocyclohexane. 1,4-diaminocyclohexane, bis(1,3-aminomethyl) cyclohexane, isophorone diamine, 1,8-diamino-p-menthane, piperazine, 4,4'trimethylenedipiperidine, and the like and mixtures thereof. The degree of neutralization may be calculated from the amount of amine added to a copolymer of known acid content, or it may be measured directly through established analytical methods, as described, for example, in U.S. Pat. No. 3,328,367. In the alternative, the degree of neutralization may be calculated based on the changes in the infrared absorption spectrum of the copolymer, as described in U.S. Pat. No. 3,471,460. In one embodiment, the amine-neutralized ethylene acid copolymers are neutralized from about 10 to about 90 mol % with amines based on the total number of equivalents of copolymerized carboxylic acid residues in the ethylene acid copolymer. In an alternative embodiment, the amine-neutralized ethylene acid copolymers are neutralized from about 20 to 80 mol % with amines.

The polymeric blend formulation comprises from 10 to 30 percent by weight of one or more adhesion promoting agents based on the weight of the polymeric blend formulation; for example from 15 to 20 weight percent.

The polymeric blend formulation may further comprise one or more additive of the type conventionally added to polymers or polymer compositions. These additives include, for example, process oils, antioxidants, surface tension modifiers, anti-block agents, dispersants, blowing agents, linear or substantially linear EAOs, LDPE, LLDPE, lubricants, crosslinking agents such as peroxides, antimicrobial agents such as organometallics, isothiazolones, organosulfurs and mercaptans; antioxidants such as phenolics, secondary amines, phosphites and thioesters; antistatic agents such as quaternary ammonium compounds, amines, and ethoxylated, propoxylated or glycerol compounds; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide; and zeolites, molecular sieves and other known deodorizers. Skilled artisans can readily select any suitable combination of additives and additive amounts as well as the method of incorporating the additive(s) into the composition without undue experimentation. Typically, each of the above additives, if used, does not exceed 40 weight percent, based on total polymeric blend formulation weight, and are advantageously from about 0.001 to about 20 weight percent; in the alternative, from about 0.01 to about 15 weight percent; and in another alternative, from about 0.1 to about 10 weight percent.

Process oils, which are often used to reduce any one or more of viscosity, hardness, and/or modulus properties of the polymeric blend formulation, are a preferred additive. The most common process oils have particular ASTM designations depending upon whether they are classified as paraffinic, naphthenic or aromatic oils. An artisan skilled in the processing of elastomers in general will recognize which type of oil will be most beneficial. The process oils, when used, are desirably present in an amount within a range of from 1 to 40 weight percent, based on the weight of the polymeric blend formulation; for example, from 1 to 4 weight percent. Such processing oils are commercially under the tradename PARALUX available from Chevron Texaco Global Lubricants.

The process for producing the polymeric blend formulation comprises the steps of: (1) providing an ethylene-based copolymer composition; (2) providing a chlorinated olefin polymer composition; (3) providing a filler; (4) providing an adhesion promoting agent; (5) optionally, providing a mineral oil; (6) melt blending said ethylene-based copolymer composition, said chlorinated olefin polymer composition, said filler, said adhesion promoting agent, and said optional mineral oil; and (7) thereby producing said polymeric blend formulation. In process, the above described components may be melt blended via any conventional method; for example, the above described components may be melt blended via an extruder, e.g. a single screw extruder or a twin screw extruder, Banbury mixer, rollmill, and the like. Such methods are generally known to a person skilled in the art.

The polymeric blend formulation may be in the form of particulate solids ranging in size from powders to chips. Powders are typically defined as particulate solids with an average particle size of less than 2000 microns. Pellets are particulate solids generally, but not exclusively, formed through extrusion and pelletization processes, with a typical average particle size greater than 2 mm, typically 2-4 mm. Micropellets typically have an average particle size less than of a standard pellet yet greater than general commercial die capabilities. The average particle size of micropellets range from 300 microns to 2 mm. The micropellets generally exhibit a semi-spheroidal shape. Chips are larger non-pellet particulate solids with average particle sizes of greater than 2 mm.

The polymeric blend formulation can be formed into synthetic leather for various end-use applications including, but not limited to, automotive upholstery, recreational vehicle upholstery, marine upholstery, seating for hospitality, fitness equipment covering, footwear, apparel, banners, tarpaulins, awning, furniture upholstery, medical sheeting, medical drapery, floor covering, wall covering, window covering, book covering, and/or luggage.

The multilayer structure according to the present inventions comprises (1) a skin layer comprising a sheet derived from the polymeric blend formulation comprising: (a) 40 to 65 percent by weight of an ethylene-based copolymer composition; (b) 15 to 40 percent by weight of a chlorinated olefin polymer composition; (c) 0.1 to 25 percent by weight of a filler; (d) 10 to 30 weight percent by weight of an adhesion promoting agent; and (e) optionally, 1 to 4 percent by weight of a mineral oil, (2) optionally, an inner layer derived from an aqueous dispersion; and (3) a substrate layer, wherein said inner layer is disposed therebetween said skin layer and said substrate layer.

The method for making the inventive multilayer structure comprises the steps of (1) laminating a sheet derived from a polymeric blend formulation comprising (a) 40 to 65 percent by weight of an ethylene-based copolymer composition; (b) 15 to 40 percent by weight of a chlorinated olefin polymer composition; (c) 0.1 to 25 percent by weight of a filler; (d) 10 to 30 weight percent by weight of an adhesion promoting agent; and (e) optionally, 1 to 4 percent by weight of a mineral oil, to a substrate, optionally, in the presence of an inner layer derived from an aqueous dispersion on at least one surface of said substrate; and (2) thereby forming said multilayer structure comprising said skin layer, optionally, an inner layer derived from said aqueous dispersion; and said substrate layer.

In general, the polymeric blend formulation is formed into a sheet via, for example, calendaring process or extrusion process, and then the sheet is laminated to a substrate, optionally, in the presence of an inner layer derived from an aqueous dispersion on at least one surface of the substrate; thus, forming the multilayer structure comprising the skin layer, optionally, an inner layer derived from the aqueous dispersion; and the substrate layer. The skin layer of the multilayer structure may further be treated by a top coating.

The substrate is a woven or a non-woven fabric or a film comprising polyester and/or polypropylene. Such substrates and method of making thereof are generally known to a person of ordinary skill in the art.

The skin layer has a thickness in the range of from 5 to 35 mils; for example, from 5 to 25 mils. The inner layer has a thickness in the range of from less than 5 mils; for example, from 1 to 5 mils. The substrate layer has a thickness in the range of from 5 to 25 mils, for example, from 5 to 10 mils. The multilayer has a thickness in the range of 10 to 55 mils; for example, from 10 to 35 mils; or in the alternative, from 15 to 30 mils.

In another embodiment, a sheet derived from the polymer blend composition is prepared via, for example, calendaring process or extrusion process. The sheet and the substrate are then laminated together via lamination process to form a multilayer structure comprising a skin layer comprising a sheet derived from the polymer blend formulation, and a substrate layer.

In another embodiment, the aqueous dispersion is applied to the substrate, for example, via dip coating process, spraying process, and/or spreading process on at least one surface of the substrate, to form a coated substrate. The substrate is heated to remove at least a portion of the water from the aqueous dispersion. In one embodiment, the coated substrate is heated for a sufficient amount of time at a temperature in the range of greater than the melting point of the one or more thermoplastic polymers to remove at least a portion of the water, for example, at least 90 percent of the water, and thus, forming a film associated with said substrate. A sheet derived from the polymer blend composition is prepared, for example, via calendaring process or extrusion process. The sheet and the coated substrate then are laminated together via lamination process to form a multilayer structure comprising a skin layer comprising a sheet derived from the polymer blend formulation, an inner layer derived from an aqueous dispersion, and a substrate layer, wherein the inner layer is disposed therebetween the skin layer and the substrate layer.

Aqueous Dispersion

The aqueous dispersion comprises the melt kneading product of one or more thermoplastic polymers and one or more stabilizing agents in the presence of water and one or more neutralizing agents, wherein the aqueous dispersion has an average volume particle size in the range of from 0.05 to 5 μm, a pH in the range of from 8 to 11, a total solid content in the range of from 35 to 65 percent by weight of one or more thermoplastic polymers and one or more stabilizing agents, and/or from 35 to 65 percent by weight of water based on the weight of the aqueous dispersion.

The method for producing the aqueous dispersion comprises the steps of (1) melt kneading one or more thermoplastic polymers and one or more stabilizing agents in the presence of water and one or more neutralizing agents to form an emulsified mixture; (2) further diluting said emulsified mixture with additional water while, optionally, further removing heat from said emulsified mixture; (3) thereby forming solid polymeric particles dispersed in water; (4) thereby producing said aqueous dispersion. The initial water to content to form the emulsified mixture is typically less than 5 percent; for example, from 1 to 3 percent, by weight of water based on the weight of emulsified mixture. The further dilution step increase the water content of the dispersion to a range from 35 to 65 percent by weight of water based on the weight of the dispersion.

Thermoplastic Polymers Suitable for Aqueous Dispersions

The aqueous dispersion comprises from 5 to 99 percent by weight of one or more thermoplastic polymers, based on the total solid content of the aqueous dispersion; for example, from 15 to 99, or from 15 to 90, or from 15 to 80, or from 15 to 75, or from 30 to 70, or from 35 to 65 weight percent based on the total solid content of the aqueous dispersion.

Examples of thermoplastic materials suitable for such aqueous dispersions include, but are not limited to, homopolymers and copolymers (including elastomers) of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer; copolymers (including elastomers) of an alpha-olefin with a conjugated or non-conjugated diene, as typically represented by ethylene-butadiene copolymer and ethylene-ethylidene norbornene copolymer; and polyolefins (including elastomers) such as copolymers of two or more alpha-olefins with a conjugated or non-conjugated diene, as typically represented by ethylene-propylene-butadiene copolymer, ethylene-propylene-dicyclopentadiene copolymer, ethylene-propylene-1,5-hexadiene copolymer, and ethylene-propylene-ethylidene norbornene copolymer; ethylene-vinyl compound copolymers such as ethylene-vinyl acetate copolymer, ethylene-vinyl alcohol copolymer, ethylene-vinyl chloride copolymer, ethylene acrylic acid or ethylene-(meth)acrylic acid copolymers, and ethylene-(meth)acrylate copolymer; styrenic copolymers (including elastomers) such as polystyrene, ABS, acrylonitrile-styrene copolymer, α-methylstyrene-styrene copolymer, styrene vinyl alcohol, styrene acrylates such as styrene methylacrylate, styrene butyl acrylate, styrene butyl methacrylate, and styrene butadienes and crosslinked styrene polymers; and styrene block copolymers (including elastomers) such as styrene-butadiene copolymer and hydrate thereof, and styrene-isoprene-styrene triblock copolymer; polyvinyl compounds such as polyvinyl chloride, polyvinylidene chloride, vinyl chloride-vinylidene chloride copolymer, polymethyl acrylate, and polymethyl methacrylate; polyamides such as nylon 6, nylon 6,6, and nylon 12; thermoplastic polyesters such as polyethylene terephthalate and polybutylene terephthalate; polycarbonate, polyphenylene oxide, and the like; and glassy hydrocarbon-based resins, including polydicyclopentadiene polymers and related polymers (copolymers, terpolymers); saturated monoolefins such as vinyl acetate, vinyl propionate, vinyl versatate, and vinyl butyrate and the like; vinyl esters such as esters of monocarboxylic acids, including methyl acrylate, ethyl acrylate, n-butyl acrylate, isobutyl acrylate, 2-ethylhexyl acrylate, dodecyl acrylate, n-octyl acrylate, phenyl acrylate, methyl methacrylate, ethyl methacrylate, and butyl methacrylate and the like; acrylonitrile, methacrylonitrile, acrylamide, mixtures thereof; resins produced by ring opening metathesis and cross metathesis polymerization and the like. These resins may be used either alone or in combinations of two or more.

Exemplary (meth)acrylates, as thermoplastic polymers suitable for aqueous dispersions, include, but are not limited to, methyl acrylate, ethyl acrylate, butyl acrylate, hexyl acrylate, 2-ethylhexyl acrylate, octyl acrylate and isooctyl acrylate, n-decyl acrylate, isodecyl acrylate, tert-butyl acrylate, methyl methacrylate, butyl methacrylate, hexyl methacrylate, isobutyl methacrylate, isopropyl methacrylate as well as 2-hydroxyethyl acrylate and acrylamide. The preferred (meth)acrylates are methyl acrylate, ethyl acrylate, butyl acrylate, 2-ethylhexyl acrylate, octyl acrylate, isooctyl acrylate, methyl methacrylate and butyl methacrylate. Other suitable (meth)acrylates that can be polymerized from monomers include lower alkyl acrylates and methacrylates including acrylic and methacrylic ester monomers: methyl acrylate, ethyl acrylate, n-butyl acrylate, t-butyl acrylate, 2-ethylhexyl acrylate, decyl acrylate, isobornyl acrylate, methyl methacrylate, ethyl methacrylate, n-propyl methacrylate, isopropyl methacrylate, n-butyl methacrylate, isobutyl methacrylate, sec-butyl methacrylate, cyclohexyl methacrylate, isodecyl methacrylate, isobornyl methacrylate, t-butylaminoethyl methacrylate, stearyl methacrylate, glycidyl methacrylate, dicyclopentenyl methacrylate, phenyl methacrylate.

In selected embodiments, thermoplastic polymers suitable for aqueous dispersions may, for example, comprise one or more polyolefins selected from the group consisting of ethylene-alpha olefin copolymers, propylene-alpha olefin copolymers, and olefin block copolymers. In particular, in select embodiments, the thermoplastic polymers suitable for aqueous dispersions may comprise one or more non-polar polyolefins.

In specific embodiments, polyolefins such as polypropylene, polyethylene, copolymers thereof, and blends thereof, as well as ethylene-propylene-diene terpolymers, may be used. In some embodiments, exemplary olefinic polymers include homogeneous polymers, as described in U.S. Pat. No. 3,645,992; high density polyethylene (HDPE), as described in U.S. Pat. No. 4,076,698; heterogeneously branched linear low density polyethylene (LLDPE); heterogeneously branched ultra low linear density polyethylene (ULDPE); homogeneously branched, linear ethylene/alpha-olefin copolymers; homogeneously branched, substantially linear ethylene/alpha-olefin polymers, which can be prepared, for example, by processes disclosed in U.S. Pat. Nos. 5,272,236 and 5,278,272, the disclosures of which are incorporated herein by reference; and high pressure, free radical polymerized ethylene polymers and copolymers such as low density polyethylene (LDPE) or ethylene vinyl acetate polymers (EVA). Substantially linear ethylene/alpha-olefin polymers are commercially available under the tradename AFFINITY™ from The Dow Chemical Company.

In other particular embodiments, the thermoplastic polymers suitable for aqueous dispersions may, for example, be ethylene vinyl acetate (EVA) based polymers. In other embodiments, the thermoplastic polymers suitable for aqueous dispersions may, for example, be ethylene-methyl acrylate (EMA) based polymers. In other particular embodiments, the ethylene-alpha olefin copolymer may, for example, be ethylene-butene, ethylene-hexene, or ethylene-octene copolymers or interpolymers. In other particular embodiments, the propylene-alpha olefin copolymer may, for example, be a propylene-ethylene or a propylene-ethylene-butene copolymer or interpolymer.

In certain other embodiments, the thermoplastic polymers suitable for aqueous dispersions may, for example, be a semi-crystalline polymer and may have a melting point of less than 110° C. In another embodiment, the melting point may be from 25 to 100° C. In another embodiment, the melting point may be between 40 and 85° C.

In one particular embodiment, thermoplastic polymer is a propylene/alpha-olefin copolymer, which is characterized as having substantially isotactic propylene sequences. "Substantially isotactic propylene sequences" means that the sequences have an isotactic triad (mm) measured by $^{13}$C NMR of greater than about 0.85; in the alternative, greater than about 0.90; in another alternative, greater than about 0.92; and in another alternative, greater than about 0.93. Isotactic triads are well-known in the art and are described in, for example, U.S. Pat. No. 5,504,172 and International Publication No. WO 00/01745, which refer to the isotactic sequence in terms of a triad unit in the copolymer molecular chain determined by $^{13}$C NMR spectra.

The propylene/alpha-olefin copolymer may have a melt flow rate in the range of from 0.1 to 25 g/10 minutes, measured in accordance with ASTM D-1238 (at 230° C./2.16 Kg). All individual values and subranges from 0.1 to 25 g/10 minutes are included herein and disclosed herein; for example, the melt flow rate can be from a lower limit of 0.1 g/10 minutes, 0.2 g/10 minutes, 0.5 g/10 minutes, 2 g/10 minutes, 4 g/10 minutes, 5 g/10 minutes, 10 g/10 minutes, or 15 g/10 minutes to an upper limit of 25 g/10 minutes, 20 g/10 minutes, 18 g/10 minutes, 15 g/10 minutes, 10 g/10 minutes, 8 g/10 minutes, or 5 g/10 minutes. For example, the propylene/alpha-olefin copolymer may have a melt flow rate in the range of from 0.1 to 20 g/10 minutes; or from 0.1 to 18 g/10 minutes; or from 0.1 to 15 g/10 minutes; or from 0.1 to 12 g/10 minutes; or from 0.1 to 10 g/10 minutes; or from 0.1 to 5 g/10 minutes.

The propylene/alpha-olefin copolymer has a crystallinity in the range of from at least 1 percent by weight (a heat of fusion of at least 2 Joules/gram) to 30 percent by weight (a heat of fusion of less than 50 Joules/gram). All individual values and subranges from 1 percent by weight (a heat of fusion of at least 2 Joules/gram) to 30 percent by weight (a heat of fusion of less than 50 Joules/gram) are included herein and disclosed herein; for example, the crystallinity can be from a lower limit of 1 percent by weight (a heat of fusion of at least 2 Joules/gram), 2.5 percent (a heat of fusion of at least 4 Joules/gram), or 3 percent (a heat of fusion of at least 5 Joules/gram) to an upper limit of 30 percent by weight (a heat of fusion of less than 50 Joules/gram), 24 percent by weight (a heat of fusion of less than 40 Joules/gram), 15 percent by weight (a heat of fusion of less than 24.8 Joules/gram) or 7 percent by weight (a heat of fusion of less than 11 Joules/gram). For example, the propylene/alpha-olefin copolymer may have a crystallinity in the range of from at least 1 percent by weight (a heat of fusion of at least 2 Joules/gram) to 24 percent by weight (a heat of fusion of less than 40 Joules/gram); or in the alternative, the propylene/alpha-olefin copolymer may have a crystallinity in the range of from at least 1 percent by weight (a heat of fusion of at least 2 Joules/gram) to 15 percent by weight (a heat of fusion of less than 24.8 Joules/gram); or in the alternative, the propylene/alpha-olefin copolymer may have a crystallinity in the range of from at least 1 percent by weight (a heat of fusion of at least 2 Joules/gram) to 7 percent by weight (a heat of fusion of less than 11 Joules/gram); or in the alternative, the propylene/alpha-olefin copolymer may have a crystallinity in the range of from at least 1 percent by weight (a heat of fusion of at least 2 Joules/gram) to 5 percent by weight (a heat of fusion of less than 8.3 Joules/gram). The crystallinity is measured via Differential scanning calorimetry (DSC) method, second heat. The propylene/alpha-olefin copolymer comprises units derived from propylene and polymeric units derived from one or more alpha-olefin comonomers. Exemplary comonomers utilized to manufacture the propylene/alpha-olefin copolymer are $C_2$, and $C_4$ to $C_{10}$ alpha-olefins; for example, $C_2$, $C_4$, $C_6$ and $C_8$ alpha-olefins.

The propylene/alpha-olefin copolymer comprises from 1 to 40 percent by weight of units derived from one or more alpha-olefin comonomers. All individual values and subranges from 1 to 40 weight percent are included herein and disclosed herein; for example, the weight percent of units derived from one or more alpha-olefin comonomers can be from a lower limit of 1, 3, 4, 5, 7, or 9 weight percent to an upper limit of 40, 35, 30, 27, 20, 15, 12, or 9 weight percent. For example, the propylene/alpha-olefin copolymer comprises from 1 to 35 percent by weight of units derived from one or more alpha-olefin comonomers; or in the alternative, the propylene/alpha-olefin copolymer comprises from 1 to 30 percent by weight of units derived from one or more alpha-olefin comonomers; or in the alternative, the propylene/alpha-olefin copolymer comprises from 3 to 27 percent by weight of units derived from one or more alpha-olefin comonomers; or in the alternative, the propylene/alpha-olefin copolymer comprises from 3 to 20 percent by weight of units derived from one or more alpha-olefin comonomers; or in the alternative, the propylene/alpha-olefin copolymer comprises from 3 to 15 percent by weight of units derived from one or more alpha-olefin comonomers.

The propylene/alpha-olefin copolymer has a molecular weight distribution (MWD), defined as weight average molecular weight divided by number average molecular weight ($M_w/M_n$) of 3.5 or less; in the alternative 3.0 or less; or in another alternative from 1.8 to 3.0.

Such propylene/alpha-olefin copolymers are further described in details in the U.S. Pat. Nos. 6,960,635 and 6,525,157, incorporated herein by reference. Such propylene/alpha-olefin copolymers are commercially available from The Dow Chemical Company, under the tradename VERSIFY™, or from ExxonMobil Chemical Company, under the tradename VISTAMAXX™.

In one embodiment, the propylene/alpha-olefin copolymers are further characterized as comprising (A) between 60 and less than 100, preferably between 80 and 99 and more preferably between 85 and 99, weight percent units derived from propylene, and (B) between greater than zero and 40, preferably between 1 and 20, more preferably between 4 and 16 and even more preferably between 4 and 15, weight percent units derived from at least one of ethylene and/or a $C_{4-10}$ α-olefin; and containing an average of at least 0.001, preferably an average of at least 0.005 and more preferably an average of at least 0.01, long chain branches/1000 total carbons, wherein the term long chain branch, as used herein with reference to propylene/alpha-olefin copolymers, refers to a chain length of at least one (1) carbon more than a short chain branch, and short chain branch, as used herein, refers to a chain length of two (2) carbons less than the number of carbons in the comonomer. For example, a propylene/1-octene interpolymer has backbones with long chain branches of at least seven (7) carbons in length, but these backbones also have short chain branches of only six (6) carbons in length. The maximum number of long chain branches typically it does not exceed 3 long chain branches/1000 total carbons. Such propylene/alpha-olefin copolymers are further described in details in the U.S. Provisional Patent Application No. 60/988,999 and International Patent Application No. PCT/US08/082,599, each of which is incorporated herein by reference.

In certain other embodiments, the thermoplastic polymers, e.g. propylene/alpha-olefin copolymer, may, for example, be a semi-crystalline polymer and may have a melting point of less than 110° C. In preferred embodiments, the melting point may be from 25 to 100° C. In more preferred embodiments, the melting point may be between 40 and 85° C.

In other selected embodiments, olefin block copolymers, e.g., ethylene multi-block copolymer, such as those described in the International Publication No. WO2005/090427 and U.S. Patent Application Publication No. US 2006/0199930, incorporated herein by reference to the extent describing such olefin block copolymers and relevant test methods therefor, may be used as the thermoplastic polymers suitable for aqueous dispersions. Such olefin block copolymer may be an ethylene/α-olefin interpolymer:

(a) having a $M_w/M_n$ from about 1.7 to about 3.5, at least one melting point, $T_m$, in degrees Celsius, and a density, d, in grams/cubic centimeter, wherein the numerical values of $T_m$ and d corresponding to the relationship:

$$T_m > -2002.9 + 4538.5(d) - 2422.2(d)^2; \text{ or}$$

(b) having a $M_w/M_n$ from about 1.7 to about 3.5, and being characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH having the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak being determined using at least 5 percent of the cumulative polymer, and if less than 5 percent of the polymer having an identifiable CRYSTAF peak, then the CRYSTAF temperature being 30° C.; or (c) being characterized by an elastic recovery, Re, in percent at 300 percent strain and 1 cycle measured with a compression-molded film of the ethylene/α-olefin interpolymer, and having a density, d, in grams/cubic centimeter, wherein the numerical values of Re and d satisfying the following relationship when ethylene/α-olefin interpolymer being substantially free of a cross-linked phase:

$$Re > 1481 - 1629(d); \text{ or}$$

(d) having a molecular fraction which elutes between 40° C. and 130° C. when fractionated using TREF, characterized in that the fraction having a molar comonomer content of at least 5 percent higher than that of a comparable random ethylene interpolymer fraction eluting between the same temperatures, wherein said comparable random ethylene interpolymer having the same comonomer(s) and having a melt index, density, and molar comonomer content (based on the whole polymer) within 10 percent of that of the ethylene/α-olefin interpolymer; or (e) having a storage modulus at 25° C., G' (25° C.), and a storage modulus at 100° C., G' (100° C.), wherein the ratio of G' (25° C.) to G' (100° C.) being in the range of about 1:1 to about 9:1.

Such olefin block copolymer, e.g. ethylene/α-olefin interpolymer may also:

(a) have a molecular fraction which elutes between 40° C. and 130° C. when fractionated using TREF, characterized in that the fraction having a block index of at least 0.5 and up to about 1 and a molecular weight distribution, $M_w/M_n$, greater than about 1.3; or (b) have an average block index greater than zero and up to about 1.0 and a molecular weight distribution, $M_w/M_n$, greater than about 1.3.

Such ethylene multi-block copolymers are commercially available under the tradename INFUSE™ from The Dow Chemical Company.

In certain embodiments, the thermoplastic polymer may, for example, comprise a polar polymer, having a polar group as either a comonomer or grafted monomer. In exemplary embodiments, the thermoplastic polymers suitable for aqueous dispersions may, for example, comprise one or more polar polyolefins, having a polar group as either a comonomer or grafted monomer. Exemplary polar polyolefins include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary thermoplastic polymers suitable for aqueous dispersions include, but are not limited to, ethylene ethyl acrylate (EEA) copolymer, ethylene methyl methacrylate (EMMA), and ethylene butyl acrylate (EBA).

In one embodiment, the thermoplastic polymers suitable for aqueous dispersions may, for example, comprise a polar polyolefin selected from the group consisting of ethylene-acrylic acid (EAA) copolymer, ethylene-methacrylic acid copolymer, and combinations thereof, and the stabilizing agent may, for example, comprise a polar polyolefin selected from the group consisting of ethylene-acrylic acid (EAA) copolymer, ethylene-methacrylic acid copolymer, and combinations thereof; provided, however, that base polymer may, for example, have a lower acid number, measured according to ASTM D-974, than the stabilizing agent.

Stabilizing Agent

The aqueous dispersion further comprises at least one or more stabilizing agents, also referred to herein as dispersion agents, to promote the formation of a stable dispersion. The stabilizing agent may preferably be an external stabilizing agent.

The aqueous dispersion comprises 1 to 50 percent by weight of one or more stabilizing agents based on the total solid content of the aqueous dispersion; for example, from 1 to 25, or in the alternative from 1 to 35, or in the alternative from 1 to 40, or in the alternative from 1 to 45 percent by weight of one or more stabilizing agents, based on the total solid content of the aqueous dispersion. In selected embodiments, the stabilizing agent may be a surfactant, a polymer, or mixtures thereof. In certain embodiments, the stabilizing agent can be a polar polymer, having a polar group as either a comonomer or grafted monomer. In exemplary embodiments, the stabilizing agent comprises one or more polar polyolefins, having a polar group as either a comonomer or grafted monomer. Exemplary polymeric stabilizing agents include, but are not limited to, ethylene-acrylic acid (EAA) and ethylene-methacrylic acid copolymers, such as those available under the trademarks PRIMACOR™, commercially available from The Dow Chemical Company, NUCREL™, commercially available from E.I. DuPont de Nemours, and ESCOR™, commercially available from ExxonMobil Chemical Company and described in U.S. Pat. Nos. 4,599,392, 4,988,781, and 5,938,437, each of which is incorporated herein by reference in its entirety. Other exemplary polymeric stabilizing agents include, but are not limited to, ethylene ethyl acrylate (EEA) copolymer, ethylene methyl methacrylate (EMMA), and ethylene butyl acrylate (EBA). Other ethylene-carboxylic acid copolymer may also be used. Those having ordinary skill in the art will recognize that a number of other useful polymers may also be used.

Other stabilizing agents that may be used include, but are not limited to, long chain fatty acids, fatty acid salts, or fatty acid alkyl esters having from 12 to 60 carbon atoms. In other embodiments, the long chain fatty acid or fatty acid salt may have from 12 to 40 carbon atoms.

The stabilizing agent may be partially or fully neutralized with a neutralizing agent. In certain embodiments, neutralization of the stabilizing agent, such as a long chain fatty acid or EAA, may be from 25 to 200 percent on a molar basis; or in the alternative, it may be from 50 to 110 percent on a molar basis. For example, for EAA, the neutralizing agent may be a base, such as ammonium hydroxide or potassium hydroxide, for example. Other neutralizing agents can include lithium hydroxide or sodium hydroxide, for example. In another alternative, the neutralizing agent may, for example, be a carbonate. In another alternative, the neutralizing agent may, for example, be any amine such as monoethanolamine, or 2-amino-2-methyl-1-propanol (AMP). Amines useful in embodiments disclosed herein may include monoethanolamine, diethanolamine, triethanolamine, and TRIS AMINO (each available from Angus), NEUTROL TE (available from BASF), as well as triisopropanolamine, diisopropanolamine, and N,N-dimethylethanolamine (each available from The Dow Chemical Company, Midland, Mich.). Other useful amines may include ammonia, monomethylamine, dimethylamine, trimethylamine, monoethylamine, diethylamine, triethylamine, mono-n-propylamine, dimethyl-n propylamine, N-methanol amine, N-aminoethylethanolamine, N-methyldiethanolamine, monoisopropanolamine, N,N-dimethyl propanolamine, 2-amino-2-methyl-1-propanol, tris(hydroxymethyl)-aminomethane, N,N,N'N'-tetrakis(2-hydroxylpropyl)ethylenediamine, 1,2-diaminopropane. In some embodiments, mixtures of amines or mixtures of amines and surfactants may be used. Those having ordinary skill in the art will appreciate that the selection of an appropriate neutralizing agent depends on the specific composition formulated, and that such a choice is within the knowledge of those of ordinary skill in the art.

Additional stabilizing agents that may be useful in the practice of the present invention include, but are not limited to, cationic surfactants, anionic surfactants, or non-ionic surfactants. Examples of anionic surfactants include, but are not limited to, sulfonates, carboxylates, and phosphates. Examples of cationic surfactants include, but are not limited to, quaternary amines. Examples of non-ionic surfactants include, but are not limited to, block copolymers containing ethylene oxide and silicone surfactants. Stabilizing agents useful in the practice of the present invention can be either external surfactants or internal surfactants. External surfactants are surfactants that do not become chemically reacted into the base polymer during dispersion preparation. Examples of external surfactants useful herein include, but are not limited to, salts of dodecyl benzene sulfonic acid and lauryl sulfonic acid salt. Internal surfactants are surfactants that do become chemically reacted into the base polymer during dispersion preparation. An example of an internal surfactant useful herein includes 2,2-dimethylol propionic acid and its salts. Additional surfactants that may be useful in the practice of the present invention include cationic surfactants, anionic surfactants, non-ionic surfactants, or combinations thereof. Various commercially available surfactants may be used in embodiments disclosed herein, including: OP-100 (a sodium stearate), OPK-1000 (a potassium stearate), and OPK-181 (a potassium oleate), each available from RTD Hallstar; UNICID 350, available from Baker Petrolite; DISPONIL FES 77-IS and DISPONIL TA-430, each available from Cognis; RHODAPEX CO-436, SOPROPHOR 4D384, 3D-33, and 796/P, RHODACAL BX-78 and LDS-22, RHODAFAC RE-610, and RM-710, and SUPRAGIL MNS/90, each available from Rhodia; and TRITON QS-15, TRITON W-30, DOWFAX 2A1, DOWFAX 3B2, DOWFAX 8390, DOWFAX C6L, TRITON X-200, TRITON XN-45S, TRITON H-55, TRITON GR-5M, TRITON BG-10, and TRITON CG-110, each available from The Dow Chemical Company, Midland, Mich.

Fluid Medium

The aqueous dispersion further comprises a fluid medium. The fluid medium may be any medium; for example, the fluid medium can be water. The aqueous dispersion comprises from 35 to 65 percent by weight of water based on the weight of the aqueous dispersion.

Forming the Dispersion

The dispersion can be formed by any number of methods recognized by those having skill in the art. In one embodiment, one or more thermoplastic polymers, and one or more stabilizing agents are melt-kneaded in an extruder in the presence of 1 to 3 percent by weight of with water and a neutralizing agent, such as ammonia, potassium hydroxide, or a combination of the two to form an emulsified mixture, and then the emulsified mixture is diluted with additional water while, optionally, heat is removed from the emulsified mixture to form solid polymeric particles dispersed in water; thus, forming a dispersion having a water content of greater than 25 weight percent, e.g. 35 to 65 weight percent based on the weight of the dispersion.

Any melt-kneading means known in the art may be used. In some embodiments, a kneader, a BANBURY® mixer, single-screw extruder, or a multi-screw extruder, e.g. a twin screw extruder, is used. A process for producing the dispersions in accordance with the present invention is not particularly limited. For example, an extruder, in certain embodiments, for example, a twin screw extruder, is coupled to a back pressure regulator, melt pump, or gear pump. Exemplary embodiments also provide a base reservoir and an initial water reservoir, each of which includes a pump. Desired amounts of base and initial water are provided from the base reservoir and the initial water reservoir, respectively. Any suitable pump may be used. In some embodiments, the base and initial water are preheated in a preheater.

Examples

The following examples illustrate the present invention but are not intended to limit the scope of the invention.

Polymeric formulation blend 1 can be made according to the following process. The formulation components, listed in Table I, which can be measured in weight percent based on the total weight of the formulation, can be melt-blended via a twin screw extruder (for example, 92 mm diameter, co-rotating, intermeshing, 44/1 L/D), and, optionally, pelletized via an underwater pelletizer.

Polymeric blend formulation 1 can be used to make sheets A and B via extrusion process in a twin screw extruder (30 mm co-rotating, intermeshing, 35/1 L/D).

Sheet A is laminated onto at least one surface of a polyester substrate via a conventional lamination processes; thus, forming the inventive multilayer structure A.

Sheet B is laminated onto at least one surface of a polyester substrate, which is coated with an aqueous polyolefin dispersion, via a conventional lamination processes; thus, forming the inventive multilayer structure B.

Test Methods

Test methods include the following:

Density is measured according to ASTM D 792-03, Method B, in isopropanol.

Melt index ($I_2$) is measured at 190° C. under a load of 2.16 kg according to ASTM D-1238-03.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

DSC Standard Method

Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

GPC Method

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, *J. Polym. Sci., Polym. Let.*, 6, 621 (1968)): $M_{polyethylene}=0.431\ (M_{polystyrene})$.

Polyethylene equivalent molecular weight calculations are performed using Viscotek TriSEC software Version 3.0.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety).

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Block Index

The ethylene/α-olefin interpolymers are characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF (i.e., fractionation of a polymer by Temperature Rising Elution Fractionation) from 20° C. and 110° C., with an increment of 5° C. (although other temperature increments, such as 1° C., 2° C., 10° C., also can be used):

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows.

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}} \text{ or } BI = -\frac{\text{Ln}P_X - \text{Ln}P_{XO}}{\text{Ln}P_A - \text{Ln}P_{AB}}$$

where $T_X$ is the ATREF (i.e., analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the olefin block copolymer. $T_{AB}$ can be calculated from the mole fraction of ethylene (measured by NMR) using the following equation:

$$\text{Ln } P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$\text{Ln } P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $\text{Ln}PX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $\text{Ln } P_{XO} = \alpha/T_X + \beta$ using a measured value of $T_X$.

Once the block index (BI) for each preparative TREF fraction is obtained, the weight average block index, ABI, for the whole polymer can be calculated.

The present invention may be embodied in other forms without departing from the spirit and the essential attributes thereof, and, accordingly, reference should be made to the appended claims, rather than to the foregoing specification, as indicating the scope of the invention.

TABLE I

| Component Type | Component Name | Formulation 1 (w %) |
|---|---|---|
| ethylene-based copolymer composition | ENGAGE 7387 | 49.5 |
| Chlorinated Olefin Polymer Composition | TYRIN 3630 | 15.5 |

TABLE I-continued

| Component Type | Component Name | Formulation 1 (w %) |
|---|---|---|
| Filler | CaCO$_3$ | 14.9 |
| Adhesion Promoting Agent | AMPLIFY GR 216 | 15 |
| Stabilizer | Mg(OH)$_2$ | 0.5 |
| Pigment | TiO$_2$ | 0.5 |
| Anti-oxidant | Irganox 1010 | 0.1 |

I claim:

1. A polymeric blend formulation consisting of:
   (a) 40 to 65 percent by weight of an elastomeric ethylene copolymer;
   (b) 15 to 40 percent by weight of a chlorinated olefin polymer;
   (c) 0.1 to 25 percent by weight of a filler;
   (d) 10 to 30 percent by weight of an adhesion promoting agent;
   (e) optionally, 1 to 4 percent by weight of a mineral oil;
   and at least one additive selected from a stabilizing agent, a processing aid, a pigment, a plasticizer, or any combination thereof.

2. The polymeric blend formulation according to claim 1, wherein said filler is calcium carbonate or said adhesion promoting agent is maleic anhydride grafted polyolefin copolymer.

3. A process for producing a polymeric blend formulation of claim 1, and comprising the steps of:
   providing an elastomeric ethylene copolymer, wherein said elastomeric ethylene copolymer consists of from 40 to 60 percent by weight based on the weight of the polymeric blend formulation;
   providing a chlorinated olefin polymer composition, wherein said chlorinated olefin polymer composition consists of from 25 to 40 percent by weight based on the weight of the polymeric blend formulation;
   providing a filler, wherein said filler consists of from 0.1 to less than 25 percent by weight based on the weight of the polymeric blend formulation; providing an adhesion promoting agent, wherein said adhesion promoting agent consists of from 10 to 30 percent by weight based on the weight of the polymeric blend formulation;
   optionally, providing a mineral oil, wherein said mineral oil consists of 1 to 4 percent based on the weight of the polymeric blend formulation;
   melt blending said ethylene-based copolymer composition, said chlorinated olefin polymer composition, said filler, said adhesion promoting agent, and said optional mineral oil; and thereby producing said polymeric blend formulation.

4. A multilayer structure comprising
   a skin layer comprising a sheet derived from a polymeric blend formulation consisting of: (a) 40 to 65 percent by weight of an elastomeric ethylene copolymer; (b) 15 to 40 percent by weight of a chlorinated olefin polymer; (c) from 0.1 to 25 percent by weight of a filler; (d) 10 to 30 percent by weight of an adhesion promoting agent; (e) optionally, 1 to 4 percent by weight a of mineral oil; and at least one additive selected from a stabilizing agent, a processing aid, a pigment, a plasticizer, or any combination thereof;
   optionally, an inner layer derived from an aqueous dispersion; and a substrate layer, wherein said inner layer is disposed there between said skin layer and said substrate layer.

5. A method for making the multilayer structure of claim 4 said method comprising the steps of laminating a sheet derived from a polymeric blend formulation consisting of (a) 40 to 65 percent by weight of an elastomeric ethylene copolymer; (b) 15 to 40 percent by weight of a chlorinated olefin polymer composition; (c) from 0.1 to 25 percent by weight of a filler; (d) 10 to 30 percent by weight of an adhesion promoting agent; (e) optionally, 1 to 4 percent by weight of a mineral oil; and at least one additive selected from a stabilizing agent, a processing aid, a pigment, a plasticizer, or any combination thereof, to a substrate, optionally, in the presence of an aqueous dispersion on at least one surface of said substrate; and thereby forming said multilayer structure comprising said skin layer, optionally, an inner layer derived from said aqueous dispersion; and said substrate layer.

* * * * *